United States Patent
Alarcon et al.

(10) Patent No.: US 8,204,989 B2
(45) Date of Patent: Jun. 19, 2012

(54) LIGHTWEIGHT DIRECTORY ACCESS PROTOCOL (LDAP) COLLISION DETECTION MECHANISM AND METHOD

(75) Inventors: Antonio Alonso Alarcon, Getafe (ES);
Maria Cruz Bartolomé Rodrigo,
Madrid (ES); Julio Vega Arnaez,
Majadahonda (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 150 days.

(21) Appl. No.: 12/741,407

(22) PCT Filed: Apr. 10, 2008

(86) PCT No.: PCT/IB2008/000876
§ 371 (c)(1),
(2), (4) Date: May 5, 2010

(87) PCT Pub. No.: WO2009/060266
PCT Pub. Date: May 14, 2009

(65) Prior Publication Data
US 2010/0268815 A1    Oct. 21, 2010

Related U.S. Application Data

(60) Provisional application No. 60/985,710, filed on Nov. 6, 2007.

(51) Int. Cl.
*G06F 15/173* (2006.01)
(52) U.S. Cl. ........................................ 709/224; 709/223
(58) Field of Classification Search .................. 709/223, 709/224
See application file for complete search history.

(56) References Cited

U.S. PATENT DOCUMENTS

| | | | | |
|---|---|---|---|---|
| 6,324,693 | B1 * | 11/2001 | Brodersen et al. | 717/177 |
| 6,493,725 | B1 * | 12/2002 | Iwai et al. | 1/1 |
| 6,516,314 | B1 * | 2/2003 | Birkler et al. | 707/621 |
| 7,689,683 | B2 * | 3/2010 | Kato et al. | 709/223 |
| 7,809,838 | B2 * | 10/2010 | Da Palma et al. | 709/227 |
| 8,010,682 | B2 * | 8/2011 | Barrett et al. | 709/228 |

OTHER PUBLICATIONS

Chiu L et al: "High level specification of concurrency control in distributed database systems" Proceedings of the International Conference on Software Engineering, Singapore, Apr. 11-15, 1988; Proceedings of the International Conference on Software Engineering, Washington, IEEE Comp, Soc. Press. US, vol. Conf. 10, Apr. 11, 1988.
Zeilenga OpenLDAP Foundation K: "Lightweight Directory Access Protocol (LDAP) Assertion Control, rfc4526.txt" IETF Standard, Internet Engineering Task Force, IETF, CH. Jun. 1, 2006, XP015046374 ISSN: 0000-0003 the application abstract.
Kurt Dzeilenga Isode Limited: "LDAP Transactions: draft-zeilenga-ldap-txn-10.txt" IETF Standard-Working-Draft, Internet Enginering Task Force, IETF, CH, No. 10, Jul. 8, 2007, XP015052374 ISSN: 0000-0004.

* cited by examiner

*Primary Examiner* — Brian P Whipple

(57) ABSTRACT

A LDAP collision detection mechanism and a method are described herein that allow a LDAP client to detect and avoid an update operation collision on an entry within a LDAP directory. The method includes the steps of: (a) reading data from the entry in the directory; (b) processing the retrieved data; (c) sending a request to modify the data in the entry in the directory, wherein the client is assured that the requested modification will not be performed by the directory if another client had previously performed a modification on the data within the entry that was originally read by the client. There are several different embodiments of the LDAP collision detection mechanism and the method described herein.

20 Claims, 9 Drawing Sheets

LIGHTWEIGHT DIRECTORY ACCESS PROTOCOL (LDAP) COLLISION DETECTION MECHANISM AND METHOD

CLAIM BENEFIT OF PRIOR FILED U.S. APPLICATION

This application claims the benefit of U.S. Provisional Patent Application Ser. No. 60/985,710 which was filed on Nov. 6, 2007 the contents of which are hereby incorporated by reference herein.

TECHNICAL FIELD

The present invention relates to a LDAP collision detection mechanism and a method for allowing a LDAP client to detect and avoid an update operation collision on an entry within a LDAP directory.

BACKGROUND

The following abbreviations are herewith defined, at least some of which are referred to within the following description of the prior art and the present invention.

| | |
|---|---|
| AAA | Authentication, Authorization and Accounting |
| CAS | Customer Administration System |
| CDC | Collision Detection Counter |
| CS | Circuit Switched |
| DIT | Directory Information Tree |
| DN | Distinguished Name |
| FE | Front End |
| EMA | Ericsson Multi Activation |
| GSM | Global System for Mobile Communications |
| HLR | Home Location Register |
| HSS | Home Subscriber Server |
| IT | Information Technology |
| LDAP | Lightweight Directory Access Protocol |
| MAP | Mobile Application Part |
| NDC | Number of Collisions to Detect |
| PS | Packet Switched |

In the communications field, the current subscriber database architecture is being challenged by an upcoming architecture from mainstream IT technology where subscriber data is kept in one or more databases separated from the nodes giving the specific service. This approach is called a multi-tier architecture and an exemplary drawing which graphically illustrates this type of architecture being used in the wireless telecommunications communications field is shown in FIG. 1.

Referring to FIG. 1, there is illustrated a communications network 100 which has an IMS network 101 including a HSS FE 102 and a provisioning FE 104 and a CS/PS core network 106 including a HLR/AuC FE 108 and an AAA FE 110. The HSS FE 102, the provisioning FE 104, the HLR/AuC FE 108 and the AAA FE 110 all interface with a centralized database 112 which may be coupled to a EMA 114 (e.g., subscription provisioning device) which in turn is coupled to a conventional CAS 116. The IMS network 101 and the CS/PS core network 106 etc. include more components than the ones shown here but for clarity only the components that are relevant to the present discussion have been described herein.

This multi-tier architecture provides several advantages, not the least of which is cheaper scalability in the service logic tier or the ability to consolidate subscriber data so that subscriber administration is easier and less expensive when compared to traditional mobile communication networks. In this multi-tier architecture, the traditional monolithic nodes (including both data and processing logic) such as the HSS, the HLR and the AAA have evolved to be processing front-ends (FE) like the HSS FE 102, the provisioning FE 104, the HLR/AuC FE 108 and the AAA FE 110 while the data now resides in the centralized database 112 or in a distributed database accessible to the above front-ends 102, 104, 108 and 110.

In this multi-tier architecture, the HLR/AuC FE 108 (for example) after receiving some external event (i.e. a MAP message) from the CS/PS core network 106, has to read subscriber-related data from the centralized database 112, process that read data in view of the data received from the CS/PS core network 106, and depending on the result of this internal processing may want to modify the subscriber-related data that is currently stored within the centralized database 112. A detailed explanation about this process has been provided below with respect to FIG. 2 (PRIOR ART) where the centralized database 112 is a LDAP directory 112 and the HLR/AuC FE 108 is a LDAP client 108.

Referring to FIG. 2 (PRIOR ART), there is a signal flow diagram illustrating how a traditional LDAP client 108 reads data 202 from an entry in a traditional LDAP directory 112 (or LDAP server 112) and then modifies the data 202 which is stored within the entry of the traditional LDAP directory 112. The steps associated with where the client 108 reads and then modifies the data are as follows:

1a-1b. Read some data 202 from an entry (or entries) in the LDAP directory 112 that client 108 is interested in, for any purpose. This requires the client 108 to send one LDAP SearchRequest operation to the LDAP directory 112 (step 1a). The LDAP server 112 then sends a copy of the data 202 from the entry (or entries) using one or more LDAP SearchResponse answers (step 1b).

2. The client 108 may use application logic to process the read data 202 for any purpose, like for example, extracting information, processing the read data against some other internal data, sending the read data to another node/process, printing some results, evaluating some conditions . . . . In this case, client 108 has updated data 202'.

3a-3b. The client 108 wants to perform some updates on the data 202 held in the previously read entry (or entries) at the LDAP directory 112. This requires the client 108 to send one LDAP ModifyRequest operation with the updated data 202' to the LDAP directory 112 (step 3a) (note: one LDAP ModifyRequest operation would be needed for each directory entry which is requested to be updated). The LDAP directory 112 updates the entry to have data 202' and sends the client 108 a success message in an LDAP ModifyResponse (Result success) operation (step 3b). A single LDAP Modify operation only applies to the targeted entry, but can contain as many modification operations (add/delete/replace) as desired on the set of attribute types that are held in that particular entry.

Unfortunately, if there are more than one or concurrent LDAP clients 102 and 108 (for example) that can interface with the LDAP directory 112, then a problematical situation as shown in FIG. 3 (PRIOR ART) may occur where the LDAP client 102 (client 2) overrides the data 202 that was previously read by LDAP client 108 (client 1) but was not yet modified by the LDAP client 108 (client 1). The steps are as follows:

1a. Client 1 requests to read some data 202 from the LDAP directory 112. This message could be a request to read any amount of data, and any standard LDAP SEARCH may be applicable and used to request the data 202.

1b. Client 1 receives the requested data 202 from the LDAP directory 112. This can be done by means of one or several LDAP messages (LDAP Search Result Entry), including a message to indicate that all requested information has been sent (LDAP Search Result Done). At this time, client 1 may take some time to perform any internal logic, for any purpose, like e.g. performing some consistency checks on the read data, connecting to another node to request some more data based on something read . . . . In this case, client 1 has updated data 202'.

2a. Client 2 requests to read some data 202 from the LDAP directory 112. This read message may request the same data as before, or part of the previously read data, or any other data within the LDAP directory 112. In this example, it is assumed that at least part of the same data 202 read in step 1b is requested by client 2.

2b. Client 2 receives the requested data 202 from the LDAP server 112. This can be done by means of one or several LDAP messages (LDAP Search Result Entry), including a message to indicate that all requested information has been sent (LDAP Search Result Done). Then, client 2 performs any required processing and logic, using or not using the read data for such purpose. In this case, client 2 has updated data 202".

3a. Client 2 requests modification of some (at least one attribute) or all of the data 202 previously read by client 1.

3b. Client 2's modification request is successful. The modification was successfully performed, because the LDAP directory 112 does not have any reason/information to not allow this modification. From this moment on, the data 202 previously read by client 1 becomes obsolete, because at least a part of that data has been overwritten by client 2.

4a. Client 1 requests modification of the previously read data 202. In particular, client 1 requests to modify one or more of the attributes of the previously read data 202 that may have been totally or partially overwritten by client 2 during the previous step 3b.

4b. Client 1's modification request is a success and data 202' is now stored in the LDAP directory 112. The LDAP directory 112 does not have any reason or information to not allow this particular modification of the data. However, it may happen that some modifications client 1 required, based on the data status at step 1b, may not still be valid. As a result, some data inconsistencies may appear.

In this particular case, it can be seen how data read by client 1 has been modified by client 2 before client 1 proceeds to update this data. This is not desirable. For example, if the updates on the data performed by client 1 are dependent on a service status to be "enabled", then it may happen that client 2 has modified this service status to be "disabled" which means that the updates by client 1 would not have to be possible. This may end up in a failure due to wrong data updates. Thus, if a LDAP client (e.g., HLR/AuC FE 108) performs an LDAP Search, processes the LDAP response, and then sends modifications (LDAP Modify) to the LDAP directory 112. Then, there is no way today to assure that once the LDAP Modify is received, the same condition is still valid, since some modifications could have been performed on the LDAP directory 112 by another LDAP client (e.g., HSS FE 102) after the moment the LDAP Search was answered in response to the request from the first LDAP client. This situation may cause data inconsistencies. Accordingly, there is and has been a need to address this particular shortcoming and other shortcomings which is addressed by the present invention.

SUMMARY

In one aspect, the present invention provides a directory and a method for detecting and avoiding collisions on an entry in the directory upon update operations from more than one client front-end (HSS-FF, HLR-FF). The directory and method perform the steps of: (a) receiving at the directory a request from a client front-end to read data on an entry in the directory; (b) assigning at the directory at least one given collision detection value corresponding to at least one subset of the data on the entry in the directory; (c) submitting towards the client front-end the requested data along with the at least one given collision detection value; (d) receiving at the directory a request from the client front-end to modify the at least one subset of the data on the entry in the directory, where the request includes at least one updated collision detection value for each at least one given collision detection value; (e) determining at the directory whether the at least one updated collision detection value is in accordance with a corresponding current collision detection value or not; (f) submitting towards the client front-end either acceptance of the request to modify the at least one subset of the data on the entry in the directory, where the at least one updated collision detection value is in accordance with the corresponding current collision detection value, or refusal of the request otherwise; and (g) where the request is found acceptable, setting the current collision detection value to a next value. This scheme is desirable since it prevents data inconsistencies and failures due to wrong data updates.

In another aspect, the present invention provides a client front-end and a method for detecting and avoiding collisions on an entry in a directory upon an update operation from the client front-end (HSS-FF, HLR-FF). The client front-end and method perform the steps of: (a) submitting a request from a client front-end to read data on an entry in the directory; (b) retrieving the requested data at the client front-end from the entry in the directory, along with at least one given collision detection value corresponding to at least one subset of the data; (c) processing the retrieved data at the client front-end; (d) sending a request from the client front-end to modify the at least one subset of the data on the entry in the directory, wherein the request includes at least one updated collision detection value for each at least one given collision detection value; and (e) receiving at the client front-end either acceptance of the request to modify the at least one subset of the data on the entry in the directory, where the at least one updated collision detection value is in accordance with a corresponding current collision detection value at the directory, or refusal of the request otherwise. This scheme is desirable since it prevents data inconsistencies and failures due to wrong data updates.

In yet another aspect, the present invention provides a system and method for allowing a client front-end to detect and avoid an update operation collision on an entry within a directory by: (a) sending a request to start a transaction towards a directory; (b) receiving a response including a transaction identifier from the directory; (c) sending a request to read data in the entry in the directory, wherein the request further includes the transaction identifier; (d) receiving a response including the read data and the transaction identifier from the directory, wherein the directory blocks the data within the entry as being part of an ongoing transaction so no other clients can modify the blocked data; (e) processing the read data; (f) sending a request to modify the data in the entry in the directory, wherein the request includes the modified data and the transaction identifier, and wherein the directory performs the request to modify the data because of the presence of the transaction identifier; and (g) sending a request to stop the transaction to the directory. This scheme is desirable since it prevents data inconsistencies and failures due to wrong data updates.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 4:
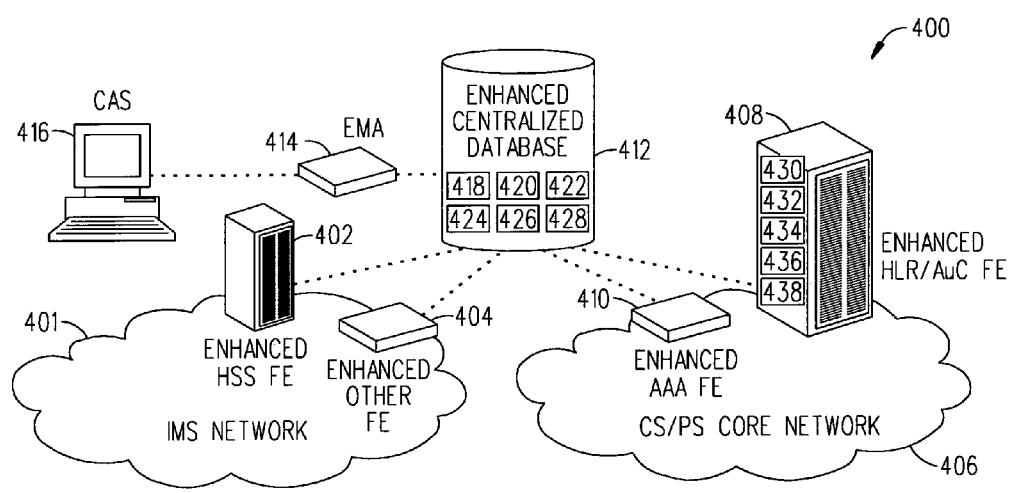
FIG. 4 is a diagram of a communications network having multiple enhanced LDAP clients that interface with an enhanced LDAP database which is used to help explain how the collision problem is solved by the present invention.

Referring to FIG. 4, there is a diagram illustrating an exemplary communications network 400 which is used to help explain how LDAP clients 402, 404, 408 and 410 and a LDAP subscriber database 412 can be enhanced in accordance with the present invention such that anyone of the enhanced LDAP clients 402, 404, 408 and 410 can detect update operation collisions on a directory entry within the enhanced LDAP database 412 (LDAP directory 412). As shown, the communications network 400 has an IMS network 401 including enhanced LDAP clients 402 and 404 respectively represented as an enhanced HSS FE 402 and an enhanced provisioning FE 404. The communications network 400 also has a CS/PS core network 406 including enhanced LDAP clients 408 and 410 respectively represented as an enhanced HLR/AuC FE 408 and an enhanced AAA FE 410. The enhanced HSS FE 402, the enhanced provisioning FE 404, the enhanced HLR/AuC FE 408 and the enhanced AAA FE 410 all interface with the enhanced centralized LDAP database 412 (or a distributed database accessible to the above front-ends 402, 404, 408 and 410) which is coupled to a EMA 414 (e.g., subscription provisioning device) which in turn is coupled to a CAS 416. The INS network 401 and the CS/PS core network 406 etc. . . . include more components than the ones shown here but for clarity only the components that are relevant to the present discussion have been described herein.

As indicated above, the present invention relates to a collision detection mechanism/method that allows a LDAP client 404 (for example) to detect an update operation collision created by a different LDAP client 408 (for example) on an entry within a LDAP directory 412. In fact, four different embodiments of such a collision detection mechanism/method are described herein all of which allow a LDAP client to detect an update operation collision created by a different LDAP client on an entry within a LDAP directory. The first embodiment of the collision detection mechanism is described next with the aid of two signal flow diagrams shown in FIGS. 5-6.

In the first embodiment, the collision detection mechanism is based on defining a new multi-valued INTEGER attribute type (named herein as the "collision detection counter" (CDC)) in each entry of the LDAP directory 412 where collisions among concurrent LDAP clients 402, 404, 408 and 410 want to be detected. For instance, this new CDC attribute may be defined as:

```
(<assigned_OID>
    NAME'cdc'
    DESC 'Collision Detection Counter'
    SYNTAX'1.3.6.1.4.1.1466.115.121.1.27'
    X-ORIGIN 'Mutex-CDC-Mechanism')
```

For details about how attributes can be defined in the first place, reference is made to RFC 4512 entitled "Lightweight Directory Access Protocol (LDAP): Directory Information Models", dated June 2006 (the contents of which are incorporated by reference herein).

This new CDC attribute may be declared as a "mandatory" attribute in the desired structural object class(es) (i.e., the object class(es) used for directory entry(ies)). In this case, each directory entry would belong to one and only one structural object class, and all the attributes that are defined as mandatory in the selected structural object class would be provisioned when the respective directory entry is created. Alternatively, the new attribute may be defined in a new "auxiliary" object class. In this case, one entry would belong to one and only one structural object class but it could also belong to zero or more auxiliary object classes.

The CDC may be managed as a cyclical counter, so it may be updated per the following mathematical expression ('%' represents the "module" operator):

$$CDC[n+1]=(CDC[n]+1)\%M$$

where "M" is the maximum number this counter can reach (so, CDC will be following the sequences: $0 \rightarrow 1 \rightarrow 2 \ldots \rightarrow (M-2) \rightarrow (M-1) \rightarrow 0 \rightarrow 1 \ldots$). At the directory entry creation it is not required that the value CDC be initialized, but it would be required to be provisioned at the entry creation.

In addition, the collision detection mechanism is also based on defining a new parameter (named herein as NCD "Number of Collisions to Detect") which indicates the maximum number of concurrent LDAP clients 402, 404, 408 and 410 that are to be considered when preventing collisions among themselves when modifying data in the LDAP directory 412.

Furthermore, the collision detection mechanism is based on adding some "extra" modification operations (for the CDC attribute value) to a standard LDAP ModifyRequest operation. A key aspect of this particular modification involves utilizing a standard LDAP behavior where a LDAP Modify message is rejected in case it tries to "add" a value to an attribute that already exists and has that same value. This is discussed in more detail below.

Using these definitions and the modified LDAP Modify message, the LDAP clients 402, 404, 408 and 410 would follow these rules:

1. Read the current CDC attribute value that is in the retrieved data (stored in an entry in the LDAP directory 412) which had been prepared for collision detection. In fact, any other number of CDC attributes values could be read, from the same entry or any other entry in the LDAP directory 412.
2. When modifying any data in the entry that has been prepared for collision detection, there are two things to take into account:
   A. The LDAP Modify message may include "add" operation (s) for the CDC attribute, for the following values:

CDC=(Read CDC value+1) %M

CDC=(Read CDC value+2) %M

. . .

CDC=(Read CDC value+NCD) %M

Note: depending on the type of CDC attribute it may be needed to consider the module M, in case a cyclical counter is used.
   B. After the "add" operation (s), the LDAP modify message includes a "replace" operation as follows:

CDC=Read CDC value+1

And, below there is an example to help better explain the use of these rules:
Assume a CDC value read by a LDAP client 402 (for example) is 0, for an entry that has been prepared for collision detection, at the same time that data is read from the LDAP directory 412. Further, assume the CDC is implemented as a cyclical counter, and M (maximum value) is 65536. Then, the CDC attribute can store values 0 to 65535 as follows:

0->1->2-> . . . ->65534->65535->0->1

Also, assume the number of collisions to be detected is set to 4 (NCD=4). This means that each LDAP client (e.g., LDAP client 402) is able to "detect" if 1, 2, 3 or even 4 other LDAP clients (e.g., LDAP clients 404, 408 and 410) have updated the "protected" entry in the time from the moment the CDC was initially read and the moment that the first LDAP client (e.g., LDAP client 402) decides to require some updates to the data in the entry.
Then, the first LDAP client (e.g., LDAP client 402) sends a LDAP Modify message that includes the following "add" operation(s):
   CDC=1
   CDC=2
   CDC=3
   CDC=4
Plus, the LDAP Modify message after the "add" operations has a "replace" operation as follows:
   CDC=1
How the LDAP directory 412 responds to this LDAP Modify message which enables the detection of a collision in concurrent access and if there is a collision then avoid performing the requested updates is discussed in detail with respect to two exemplary sequence diagrams. For completeness, the two exemplary sequence diagrams also include a description about the steps where the LDAP clients read the data, process the read data, and then send a request to modify the data within the LDAP directory 412.

Figure 5:
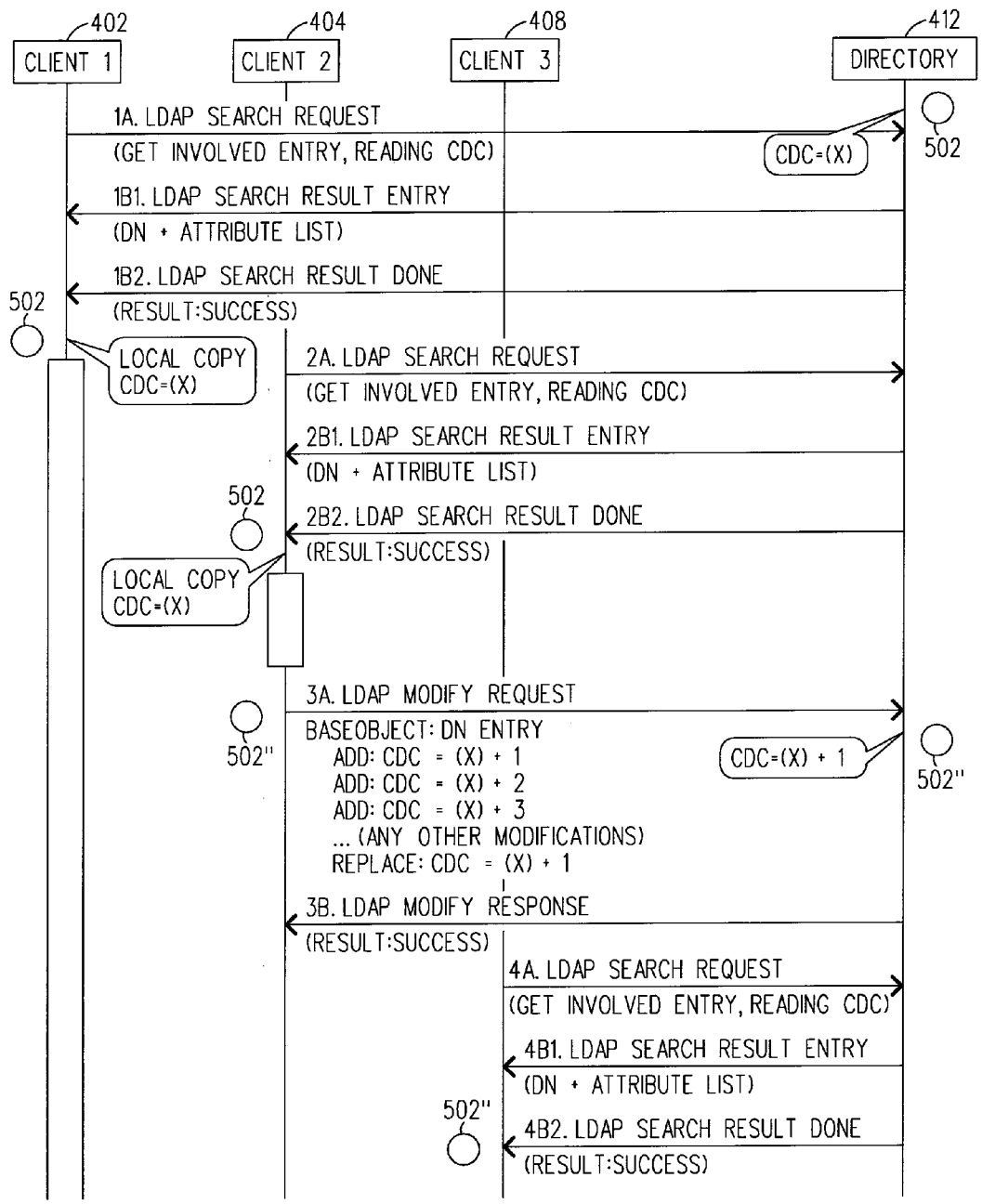
FIGS. 5-6 are signal sequence diagrams which are used to help explain how the collision problem is solved by a collision detection mechanism/method in accordance with a first embodiment of the present invention.
Figure 5:
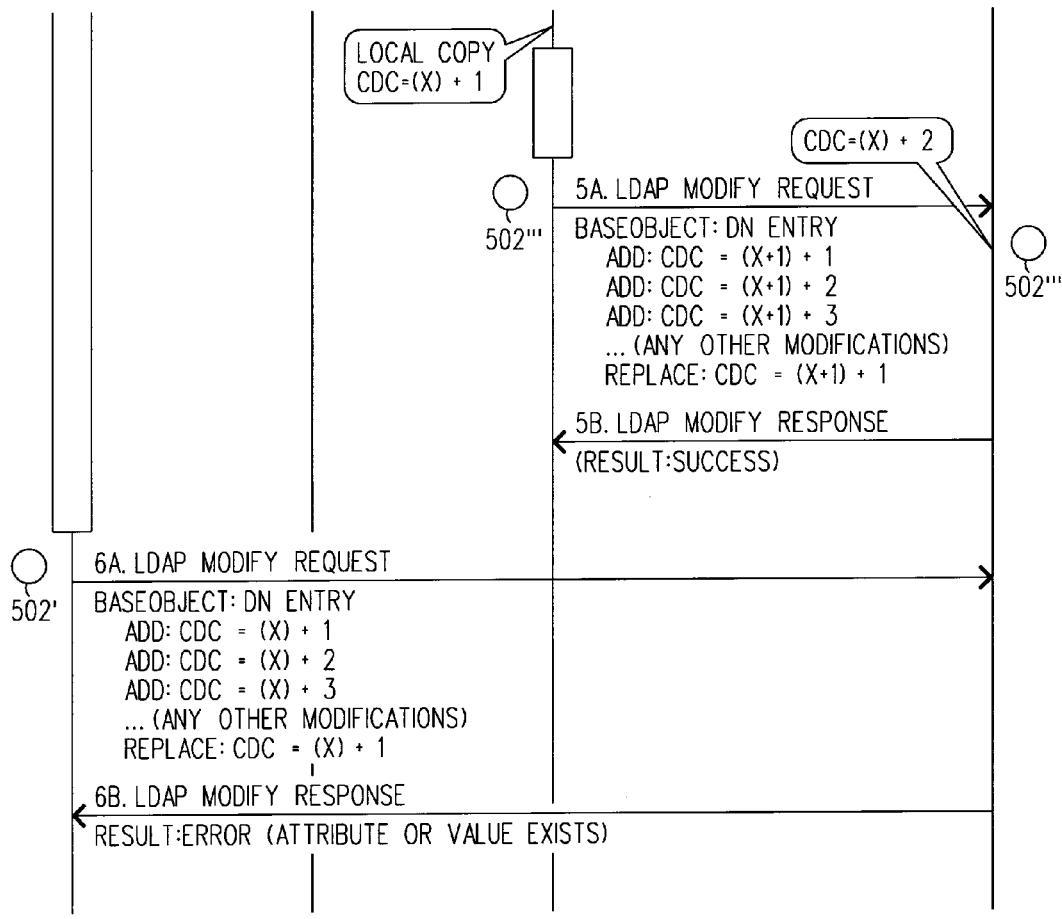

Referring to FIG. 5, there is a signal sequence diagram illustrating one example of implementing the collision detection mechanism where the selected NCD value was equal to what is needed to properly detect a collision in accordance with the present invention. In this example, they are shown three concurrent LDAP clients 402, 404 and 408 (Clients 1, 2 and 3) as such NDC=3 would sufficient but greater NDC's like NDC=4 would also be sufficient to avoid performing a requested update by one of the LDAP clients 402, 404 and 408 if there was a collision between any of the LDAP clients 402, 404 and 408. The steps are as follows:

1a. Client 1 sends a message to read some data 502 from an entry in the LDAP directory 412. This message would be a request to read any amount of data including the CDC, and any standard LDAP SEARCH may be used to request the data 502 and the CDC value.

1b1.-1b2. Client 1 receives the requested data 502 and CDC value from the LDAP directory 412. This can be done by means of a LDAP Search Result Entry which includes the requested information (DN, attribute list, CDC value)(step 1b1) and by means of a LDAP Search Result Done which indicates that the search was a success (step 1b2). In this example, client 1's local copy of read data has a CDC=(x). At this time, client 1 may take some time to perform any internal logic, for any purpose, like e.g. performing some consistency checks on the read data, connecting to another node to request some more data based on something read . . . . In this case, client 1 has updated data 502'.

2a. Client 2 sends a message to read at least a portion of the same data from the same entry in the LDAP directory 412. This message would be a request to read any amount of data including the CDC, and any standard LDAP SEARCH may be used to request the data and the CDC value.

2b1.-2b2. Client 2 receives the requested data 502 and CDC value from the LDAP directory 412. This can be done by means of a LDAP Search Result Entry which includes the requested information (DN, attribute list, CDC value)(step 2b1) and by means of a LDAP Search Result Done which indicates that the search was a success (step 2b2). In this example, client 2's local copy of read data has a CDC=(x). At this time, client 2 may take some time to perform any internal logic, for any purpose, like e.g. performing some consistency checks on the read data, connecting to another node to request some more data based on something read . . . . In this case, client 2 has updated data 502".

3a. Client 2 requests modification of the read data 502 at least a portion of which was also read by client 1. In particular, client 2 sends a LDAP Modify Request which includes: (1) a base object: DN entry; (2) three add operations: Add: CDC=(x)+1; CDC=(x)+2; CDC=(x)+3; (3) modified data 502"; and (4) a replace operation: Replace: CDC=(x)+1.

3b. Client 2 receives a LDAP Modify Response from the LDAP directory 412 indicating that the modification request was successful. The modification was successfully performed, because the LDAP directory 412 did not have a CDC attribute which had the same value that was in any of the three "add" operations. In particular, LDAP directory 412 had a CDC value of (x) before the three add operations and those add operations where for CDC=(x)+1, CDC=(x)+2, CDC=(x)+3. RECALL: standard LDAP behavior is such that an LDAP Modify message would be rejected if it tried to "add" a value to an attribute that already exists and has that same value (discussed in detail in step 6a). At this point, the LDAP directory 412 has associated the read entry with data 502" and a CDC=(x)+1.

4a. Client 3 sends a message to read at least a portion of the same data from the same entry in the LDAP directory 412. This message would be a request to read any amount of data including the CDC, and any standard LDAP SEARCH may be used to request the data and the CDC value.

4b1.-4b2. Client 3 receives the requested data 502" from the LDAP directory 412. This can be done by means of a LDAP Search Result Entry which includes the requested information (DN, attribute list, CDC value) (step 4b1) and by means of a LDAP Search Result Done which indicates that the search was a success (step 4b2). In this example, client 3's local copy of read data has a CDC=(x)+1. At this time, client 3 may take some time to perform any internal logic, for any purpose, like e.g. performing some consistency checks on the read data, connecting to another node to request some more data based on something read . . . . In this case, client 3 had updated data 502'".

5a. Client 3 requests modification of the read data at least a portion of which was also read from the same entry by clients 1 and 2. In particular, client 3 sends a LDAP Modify Request which includes: (1) a base object: DN entry; (2) three add operations: Add: CDC=(x+1)+1; CDC=(x+1)+2; CDC=(x+1)+3; (3) modified data 502'"; and (4) a replace operation: Replace: CDC=(x+1)+1.

5b. Client 3 receives a LDAP Modify Response from the LDAP directory 412 indicating that the modification request was successful. The modification was successfully performed, because the LDAP directory 412 did not have a CDC attribute which had the same value that was in the three "add" operations. In particular, LDAP directory 412 had a CDC value of (x+1) before the three add operations and those add operations where for CDC=(x+1)+1, CDC=(x+1)+2, CDC=(x+1)+3. RECALL: standard LDAP behavior is such that an LDAP Modify message would be rejected if it tried to "add" a value to an attribute that already exists and has that same value (discussed in detail in step 6a). At this point, the LDAP directory 412 has associated the read entry with data 502'" and a CDC=(x)+2.

6a. Client 1 requests modification of the data 502 that was read back in steps 1a-1b. In particular, client 1 sends a LDAP Modify Request which includes: (1) a base object: DN entry; (2) three add operations: Add: CDC=(x)+1; CDC=(x)+2; CDC=(x)+3; (3) modified data 502'; and (4) a replace operation: Replace: CDC=(x)+1.

6b. Client 1 receives a LDAP Modify Response from the LDAP directory 412 indicating that the modification request was not successful. The modification was not successfully performed, because the LDAP directory 412 had a CDC attribute namely CDC=(x)+2 which is the same value that was in the second "add" operation. RECALL: standard LDAP behavior is such that an LDAP Modify message would be rejected if it tried to "add" a value to an attribute that already exists and has that same value. This happened in step 6a as such a collision was successfully detected.

Figure 6:
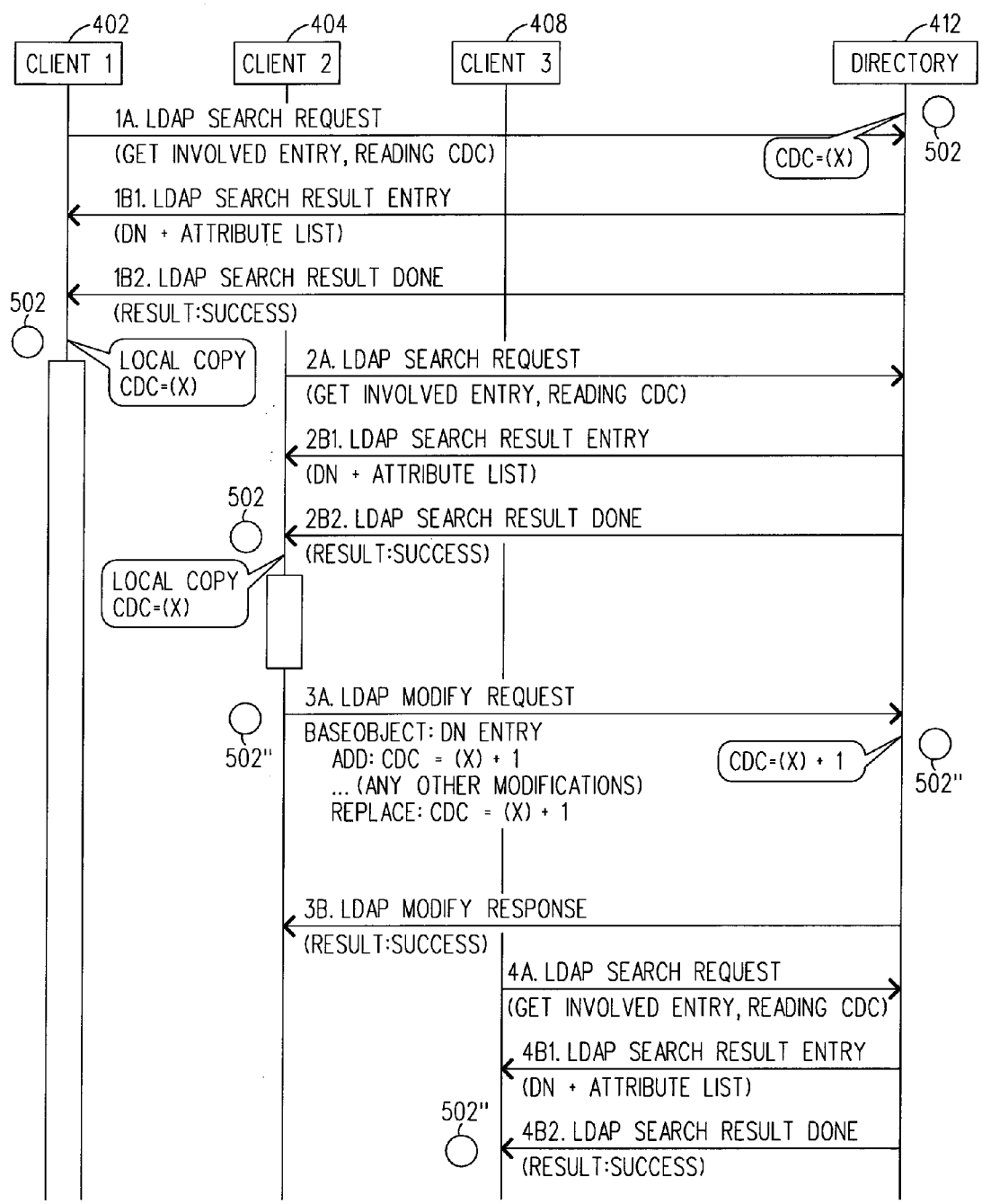
Figure 6:
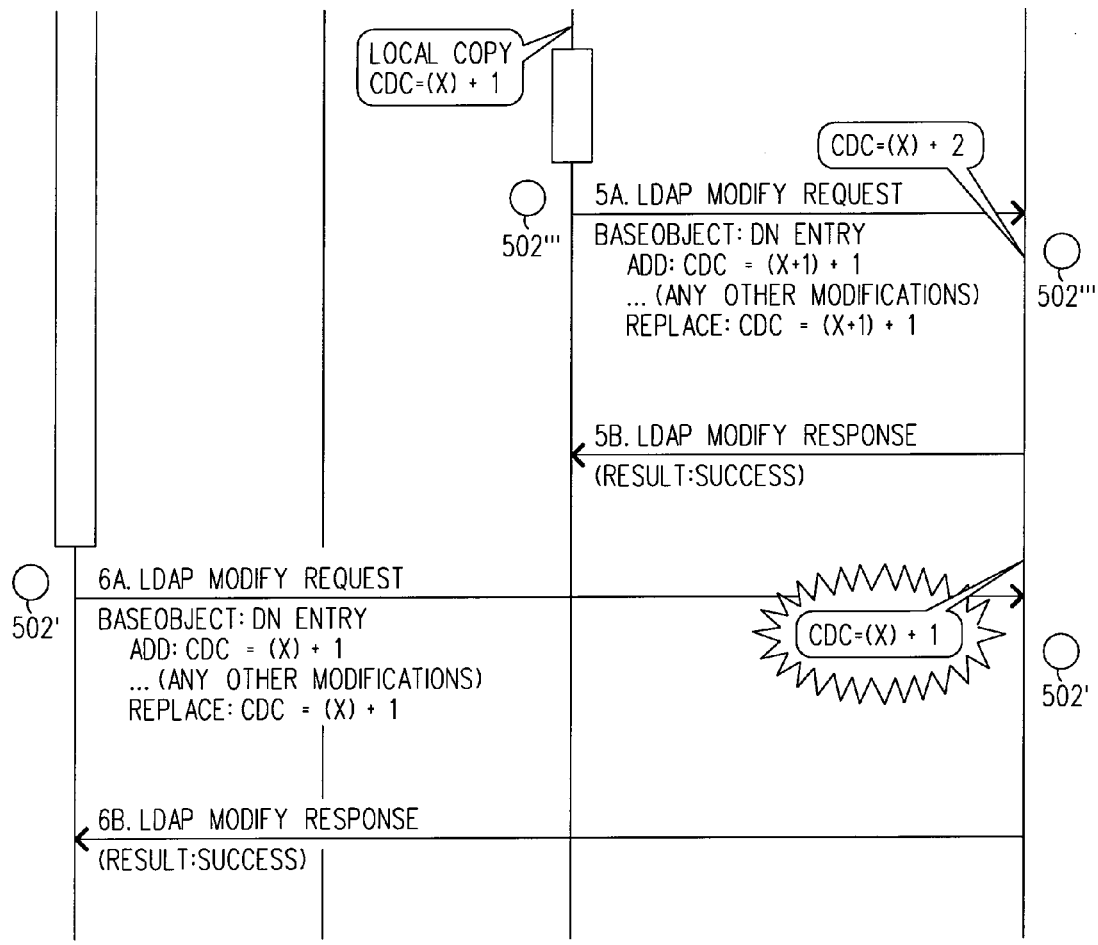

Referring to FIG. 6, there is a signal sequence diagram which is provided to illustrate a problem that can occur if the selected NCD value is lower than what is needed which makes it difficult to properly detect all of the possible collisions in accordance with the present invention. In this example, there are shown three concurrent LDAP clients 402, 404 and 408 (Clients 1, 2 and 3) but the NDC=1 which can lead to problems in detecting collisions between the LDAP clients 402, 404 and 408. The steps are as follows:

1a. Client 1 sends a message to read some data 502 from an entry in the LDAP directory 412. This message would be a request to read any amount of data including the CDC, and any standard LDAP SEARCH may be used to request the data 502 and the CDC value.

1b1.-1b2. Client 1 receives the requested data 502 and CDC value from the LDAP directory 412. This can be done by means of a LDAP Search Result Entry which includes the requested information (DN, attribute list, CDC value)(step 1b1) and by means of a LDAP Search Result Done which indicates that the search was a success (step 1b2). In this example, client 1's local copy of read data has a CDC=(x). At this time, client 1 may take some time to perform any internal logic, for any purpose, like e.g. performing some consistency checks on the read data, connecting to another node to request some more data based on something read . . . . In this case, client 1 has updated data 502'.

2a. Client 2 sends a message to read at least a portion of the same data from the same entry in the LDAP directory 412. This message would be a request to read any amount of data including the CDC, and any standard LDAP SEARCH may be used to request the data and the CDC value.

2b1.-2b2. Client 2 receives the requested data 502 and CDC value from the LDAP directory 412. This can be done by means of a LDAP Search Result Entry which includes the requested information (DN, attribute list, CDC value)(step 2b1) and by means of a LDAP Search Result Done which indicates that the search was a success (step 2b2). In this example, client 2's local copy of read data has a CDC=(x). At this time, client 2 may take some time to perform any internal logic, for any purpose, like e.g. performing some consistency checks on the read data, connecting to another node to request some more data based on something read . . . . In this case, client 2 has updated data 502".

3a. Client 2 requests modification of the read data 502 at least a portion of which was also read by client 1. In particular, client 2 sends a LDAP Modify Request which includes: (1) a base object: DN entry; (2) one add operation: Add: CDC=(x)+1; (3) modified data 402"; and (4) a replace operation: Replace: CDC=(x)+1.

3b. Client 2 receives a LDAP Modify Response from the LDAP directory 412 indicating that the modification request was successful. The modification was successfully performed, because the LDAP directory 412 did not have a CDC attribute which had the same value that was in the one "add" operation. In particular, LDAP directory 412 had a CDC value of (x) before the add operation of CDC=(x)+1. RECALL: standard LDAP behavior is such that an LDAP Modify message would be rejected if it tried to "add" a value to an attribute that already exists and has that same value. At this point, the LDAP directory 412 has associated the read entry with data 402" and a CDC=(x)+1.

4a. Client 3 sends a message to read at least a portion of the same data from the same entry in the LDAP directory 412. This message would be a request to read any amount of data including the CDC, and any standard LDAP SEARCH may be used to request the data and the CDC value.

4b1.-4b2. Client 3 receives the requested data 502" from the LDAP directory 412. This can be done by means of a LDAP Search Result Entry which includes the requested information (DN, attribute list, CDC value) (step 4b1) and by means of a LDAP Search Result Done which indicates that the search was a success (step 4b2). In this example, client 3's local copy of read data has a CDC=(x)+1. At this time, client 3 may take some time to perform any internal logic, for any purpose, like e.g. performing some consistency checks on the read data, connecting to another node to request some more data based on something read .... In this case, client 3 has updated data 502'''.

5a. Client 3 requests modification of the read data at least a portion of which was also read from the same entry by clients 1 and 2. In particular, client 3 sends a LDAP Modify Request which includes: (1) a base object: DN entry; (2) one add operation: Add: CDC=(x+1)+1; (3) modified data 502'''; and (4) a replace operation: Replace: CDC=(x+1)+1.

5b. Client 3 receives a LDAP Modify Response from the LDAP directory 412 indicating that the modification request was successful. The modification was successfully performed, because the LDAP directory 412 did not have a CDC attribute which had the same value that was in the one "add" operation. In particular, LDAP directory 412 had a CDC value of (x+1) before the add operation CDC=(x+1)+1. RECALL: standard LDAP behavior is such that an LDAP Modify message would be rejected if it tried to "add" a value to an attribute that already exists and has that same value. At this point, the LDAP directory 412 has associated the read entry with data 502''' and a CDC=(x)+2.

6a. Client 1 requests modification of the data 502 that was read back in steps 1a-1b. In particular, client 1 sends a LDAP Modify Request which includes: (1) a base object: DN entry; (2) one add operation: Add: CDC=(x)+1; (3) modified data 502'; and (4) a replace operation: Replace: CDC=(x)+1.

6b. Client 1 receives a LDAP Modify Response from the LDAP directory 412 indicating that the modification request was successful. The modification was performed because the LDAP directory 412 did not have a CDC attribute which had the same value that was in the one "add" operation. In particular, LDAP directory 412 had a CDC value of (x)+2 before the add operation CDC=(x)+1. This is not desirable since both clients 2 and 3 previously modified the data however the collision detection mechanism of the present invention did not detect these collisions because the NCD value was too low which meant that not enough add operations where in the LDAP Modify Request messages sent by clients 1, 2 and 3.

This particular signal sequence diagram shows the need to select the right value for parameter NCD so that the collision detection mechanism can detect all possible collisions. In this example, the NCD had been set to "1", so no more than two concurrent accesses could have been detected and undesirable modifications to the data could not have been avoided. Thus, to help assure the proper implementation of the collision detection mechanism the following two recommendations should be followed: (1) the "NCD" value: should be selected to be greater or equal than the maximum number of "concurrent clients" (i.e. LDAP clients accessing the same entry at the same time interval) that could modify that entry in the time interval after anyone of the LDAP clients retrieves the data (retrieved with an LDAP Search operation, including always the CDC attribute type) and the moment that particular LDAP client sends the updates to perform (requested with an LDAP Modify operation); and (2) selecting the "M" value: where the "M" should be selected to be much greater than the NCD value.

In summary, the collision detection mechanism associated with the first embodiment of the present invention relies in part on the standard behavior associated with the LDAP Modify operation that is described in the aforementioned RFC 4511. First, it is standard behavior where an entire list of modifications within a LDAP Modify Request must be performed in the order that they are listed as a single atomic operation (see section 4.6 "Modify Operation" in RFC 4511).

As such, the collision detection mechanism of the present invention has a LDAP Modify Request in which the "add" operation(s) are always presented so that they are performed before the "replace" operation (see steps 3a, 5a and 6a in FIG. 5).

Second, it is standard behavior that add values which are listed to the modification attribute, results in the creation of the attribute if necessary. As such, in the collision detection mechanism when an "add" is performed on a multi-valued attribute, the new requested value is added to the existing list. If the value already exists, then a result code 20 ("AttributeOrValueExists") is returned per the standard behavior. Thus, the collision detection mechanism utilizes the standard behavior when establishing the add operation(s) such that if the value that is to be "added" already exists, then the requested modification is rejected. This rejection happens only if some other client has updated the CDC to a new value (see step 6a in FIG. 5).

Third, it is standard behavior that a replace operation will result in the replacement of all existing values of the modification attribute with the new value listed, and the creation of the attribute if it did not already exist. A replace with no value will delete the entire attribute if it exists, and it is ignored if the attribute does not exist. In the collision detection mechanism, a client uses the "replace" operation in the LDAP Modify message to update the CDC attribute to the next value. Then, when the next client wanting to modify the data assuming there was not collision detected with the "add" operation (s) would have the responsibility to update the CDC to the next value, so another client could detect this modification as being a potential collision.

As can be seen, due to the standard behavior's requirement for atomicity in applying this list of modifications in a LDAP Modify Request, the client 402, 404 and 408 may expect that no modifications of the DIT in the LDAP directory 412 would be performed if the Modify Response received indicates any sort of error, and that all requested modifications have been performed if the Modify Response indicates successful completion of the Modify operation.

In the example and explanations above, it was considered that there was one CDC attribute for each entry (in the LDAP directory 412) that was prepared to detect collisions. However, it may happen that the same entry could have multiple CDC attributes, to allow for more granularity in the collision detection mechanism, then a collision would be detected for a group of attributes within an entry. This would improve the collision detection mechanism since it allows more effective concurrent access, as long as they are not accessing data within the same entry which belongs to the same group (i.e. the same CDC).

Figure 7:
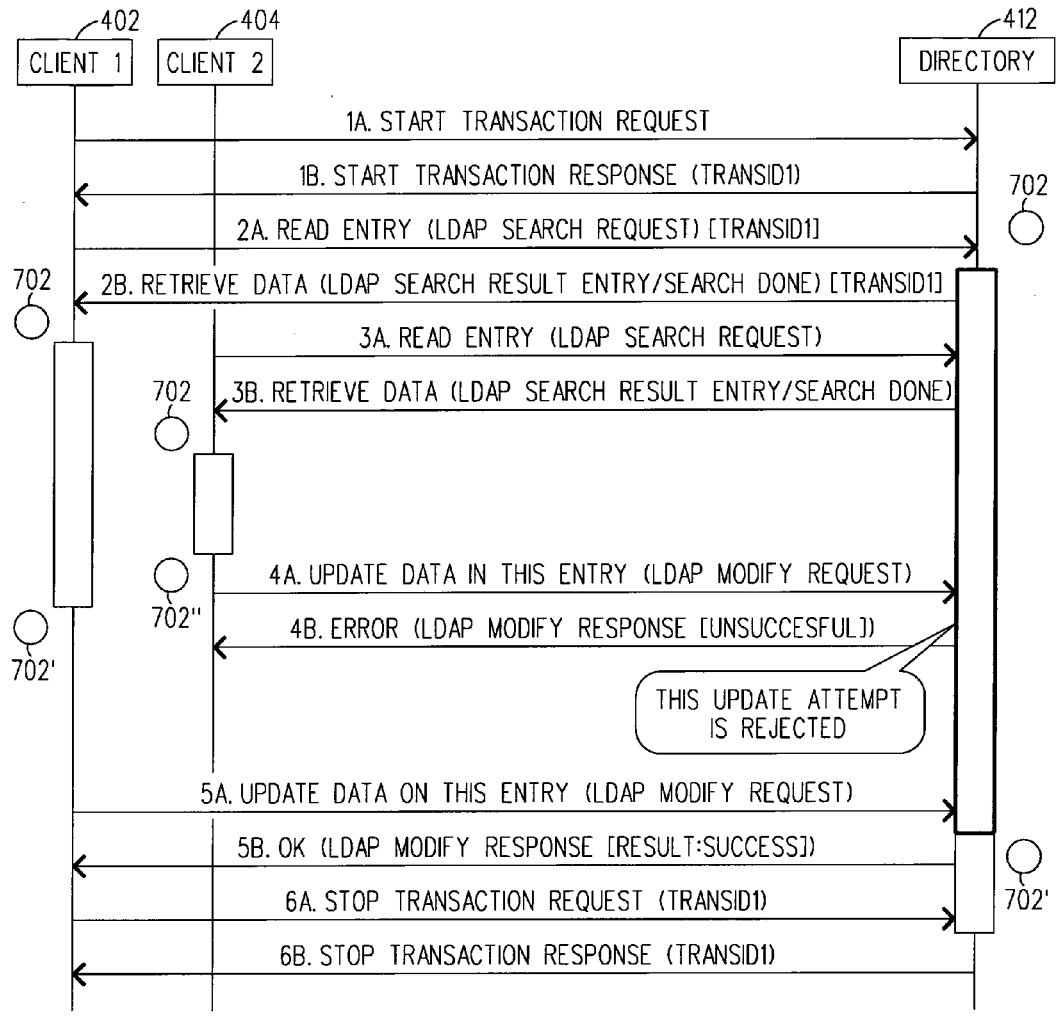
FIG. 7 is a signal sequence diagram used to help explain how the collision problem is solved by a collision detection mechanism/method in accordance with a second embodiment of the present invention.

Referring to FIG. 7, there is a signal sequence diagram used to help explain another collision detection mechanism that can be used to detect a collision in accordance with a second embodiment of the present invention. This collision detection mechanism makes use of what is known as transactionality in LDAP where an LDAP transaction is understood to be associated with a group of one or several operations in which there is specified a beginning and an end for the group of operations. Plus, when a LDAP transaction is sent to a LDAP directory 412 there is a warranty of atomicity where either all of the operations included in such transaction or none of the operations are performed by the LDAP directory 412. In this sense, it may be regarded from a LDAP client 402, 404, 408 and 410 perspective as if all of the operations included into one LDAP transaction, could be considered a single operation. The second embodiment of the collision detection mechanism in the present invention utilizes LDAP transactionality to help with the detection and avoidance of collision(s). How this is done is described in the steps that follow:

1a. Client 1 starts a transaction in LDAP by sending a StartTransactionRequest to the LDAP directory 412. This could be a new LDAP message, which may be empty, whose function is to request the LDAP directory 412 to generate a transaction identifier.

1b. Client 1 receives a response (StartTransactionResponse) to its previous request to start a transaction in LDAP. This response could be a new LDAP message that includes, at least, a transaction identifier (TransId1). This identifier will be included in any LDAP message that the LDAP client 1 requires to be processed as part of the same transaction, i.e. being considered part of a group of messages, that from the application could be considered as one single operation.

2a. Client 1 sends a request (LDAPSearchRequest) to read some data 702 from the LDAP directory 412. This LDAP SEARCH message includes the just generated transaction identifier (TransId1), meaning that this message should be part of a transaction, i.e. of a group of messages. This LDAP SEARCH message could request to read any amount of data 702, and any standard LDAP SEARCH may be applicable.

At this time, the LDAP directory 412 implements an internal mechanism that is able if necessary to block "read" data (or part of that "read" data), in a sense that, if the following operations are for the same transaction (i.e. including same TransactionId) then these operations would be performed on the data read at this moment. However, any other message that does not have this transaction (i.e. that does not include same TransactionId) would not be able to access this "blocked" data. This "blocked" data is shown in FIG. 7 as being surrounded by a bold box which indicates this data can not be modified/accessed until this particular transaction which was started by client 1 is finished.

2b. Client 1 receives a read response (LDAPSearchResultEntry/SearchDone) which includes the requested data 702 from the LDAP directory 412. At this time, client 1 may take some time to perform any internal logic, for any purpose, like e.g. performing some consistency checks on the read data, connecting to another node to request some more data based on something read . . . . In this case, client 1 has updated data 702'.

3a. Client 2 sends a request (LDAPSearchRequest) to read at least a portion of the same data 702 from the same entry in the LDAP directory 412. This read request could be a transaction that is different from the previous one used by client 1 (this type of request not shown), or it could be an independent message (as shown) regardless of which request is used the same behavior still applies.

3b. Client 2 receives a read response (LDAPSearchResultEntry/SearchDone) which includes the requested data 702. This is possible since the read request message is not an update message. In this example, it is assumed that the same (or part of) the "blocked" data 702 is read. Thereafter, client 2 performs any required processing and logic, using or not the read data for such purpose. In this case, client 2 has updated data 702".

4a. Client 2 sends an update request (LDAP ModifyRequest) requesting the modification of the data "blocked" by client transaction. The LDAP directory 412 identifies that this data has been "blocked" as part of a previous transaction which means that this particular modification will not be permitted.

4b. Client 2 receives an error message (LDAPModifyResponse[unsuccesful]) indicating that the modification request was rejected. In this example, client 2's modification request was rejected with an error message. However, the specific behavior when a modification is not permitted may vary, another option may be to queue the request until the previous started transaction is ended. Again, a main purpose of this scheme is to not allow client 2 to override any data 702 that was read by client 1 and is part of an ongoing transaction.

5a. Client 1 sends an update request (LDAP ModifyRequest) requesting the modification of the data 702 as part of the ongoing transaction. In this example, assume client 1 sends a request to modify one of several attributes of the "blocked" data 702, as part of ongoing transaction, i.e. the modifying message includes the corresponding TransactionId (TransId1) and the modified data 702'. The LDAP directory 412 identifies that this request is within an ongoing transaction and as such this modification is permitted on the data 702 that was previously "blocked" as part of the same transaction.

5b. Client 1 receives a modification success message (LDAPModifyResponse[Result Success]) from the LDAP directory 412. Since, the modification was considered part of the same transaction, for that reason, it was successfully processed in step 5a.

6a. Client 1 sends a request (StopTransactionRequest(TransId1)) to the LDAP directory 412 which closes the ongoing transaction. This request may be a new LDAP message that includes the TransactionId of the corresponding LDAP transaction which is to be closed.

6b. Client 1 receives a message (StopTransactionRequest (TransId1)) indicating that the LDAP directory 412 successfully closed the LDAP transaction. This message may be a new LDAP message which confirms the successful execution of closing transaction request. In fact, this step could be optional since this confirmation may not be needed at client side.

As can be seen, in this procedure a collision detection mechanism is implemented which prevents client 2 from overriding some data that client 1 does not want to be modified at this particular time. In this scheme, new LDAP messages have been presented at steps 1a, 1b, 6a and 6b as well a new control field including a Transaction Id has been presented. Plus, this collision detection mechanism uses new LDAP Search messages with a Transaction Id as discussed above in steps 2a and 2b. For more details about LDAP transactionality which is used by this particular mechanism, reference is made to a paper by K. Zeilenga entitled "RFC 4528: Lightweight Directory Access Protocol (LDAP) Assertion Control" dated June 2006 (the contents of this document are incorporated herein by reference).

Figure 8:
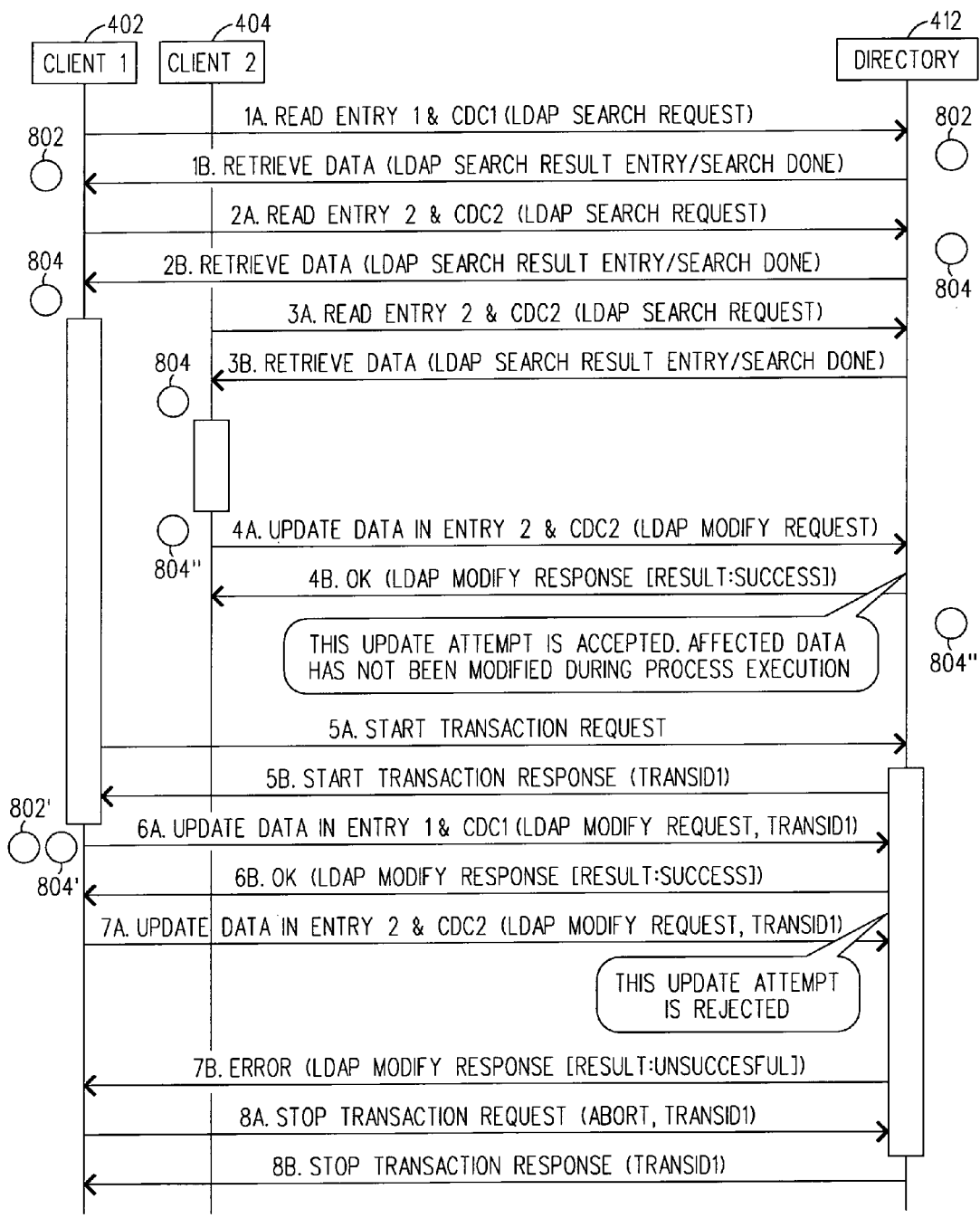
FIG. 8 is a signal sequence diagram used to help explain how the collision problem is solved by a collision detection mechanism/method in accordance with a third embodiment of the present invention.

Referring to FIG. 8, there is a signal sequence diagram used to help explain another collision detection mechanism that can be used to detect a collision in accordance with a third embodiment of the present invention. This collision detection mechanism makes use of LDAP transactionality and the aforementioned CDC parameter (which is defined in each of the entries) to validate the modification of one or multiple entries included in the transaction as described below:

1a & 2a. Client 1 sends two requests (LDAPSearchRequests) to read some data 802 and 804 and the CDC information from entries 1 and 2 in the LDAP directory 412. Each of these standard LDAP SEARCH messages could request to read any amount of data and the CDC value from entries 1 and 2.

1b & 2b. Client 1 receives messages (two LDAPSearchResultEntry/SearchDone) from the LDAP directory 412 including the requested data 802 and 804 in entries 1 and 2 and their corresponding CDC values. At this time, client 1 takes some time to perform any internal logic, for any purpose, like e.g. performing some consistency checks on the read data, connecting to another node to request some more data based on something read . . . . In this case, client 1 has updated data 802' and 804'.

3a. Client 2 sends a request (LDAPSearchRequest) to read some data 804 from entry 2 in LDAP directory 412. This request could be a transaction that is different from the previous one used by client 1 (this type of request is not shown), or it could be an independent message (as shown) regardless of which request is used the same behavior still applies. In this example, it is assumed that the same (or part of) "blocked" data 804 is read.

3b. Client 2 receives a message (LDAPSearchResultEntry/ SearchDone) from the LDAP directory 412 including requested data in entry 2 and the corresponding CDC value. Then, client 2 performs any required processing and logic, using or not the read data for such purpose. In this case, client 2 has updated data 804".

4a. Client 2 sends a message (LDAPModifyREquest) that requests modification of the data in entry 2 of the LDAP directory 412. Several attributes in entry 2 are requested to be modified, including the modification of CDC value for entry 2. The CDC value modification is done by using the same process described above with respect to the first embodiment of the present invention. No transaction is opened in this case, because only one entry is impacted.

4b. Client 2 receives a message (LDAPModifyResponse[ResultSuccess]) from the LDAP directory 412 indicating the modification request was accepted. The modification requested in step 4a was accepted, and the modified data 804" was stored in entry 2 and the CDC value for entry 2 was updated.

5a. Client 1 sends a message (StartTransactionRequest) requesting to start a transaction with the LDAP directory 412. This message also requests the LDAP directory 412 to generate a transaction identifier.

5b. Client 1 receives a message (StartTransactionResponse (TransId1)) in response to the request to start a transaction in the LDAP directory 412. In particular, the LDAP directory 412 returns a transaction identifier (TransId1).

6a. Client 1 sends a message (LDAPModifyRequest(TransId1)) to request a modification of data in entry 1 of the LDAP directory 412. Several attributes in entry 1 are requested to be modified, including the modification of CDC value for entry 1. The CDC value modification is done by using the same process described above with respect to the first embodiment of the present invention.

6b. The LDAP directory 412 accepts client 1's modification request since the CDC value has not been changed for the corresponding entry 1. But, the modification operation remains pending to be executed when the complete transaction is accepted.

7a. Client 1 sends a message (LDAPModifyRequest(TransId1)) to request a modification of the data in entry 2 of the LDAP directory 412. Several attributes in entry 2 are requested to be modified, including the modification of CDC value for entry 2. The CDC value modification is done by using the same process described above with respect to the first embodiment of the present invention.

7b. Client 1 receives a message (LDAPModifyResponse[ResultUnsuccessful]) indicating the modification request for entry 2 was rejected by the LDAP directory 412. The LDAP directory 412 rejected this modification because in this example the CDC value for the entry 2 was modified by the process executed by client 2 during step 4a.

8a. Client 1 sends a message (StopTransactionRequest [Abort, TransId1]) to 'abort' the ongoing transaction because a part of it could not be executed.

This may be a new LDAP message that includes the TransactionId of the corresponding transaction that is to be closed.

8b. Client 1 receives a message (StopTransactionResponse [TransId1]) from the LDAP directory 412 indicating the transactions have been successfully closed. This may be a new LDAP message to confirm successful execution of the closing transaction request. Alternatively, this could be an optional message since confirmation may not be needed at the client side.

Figure 9:
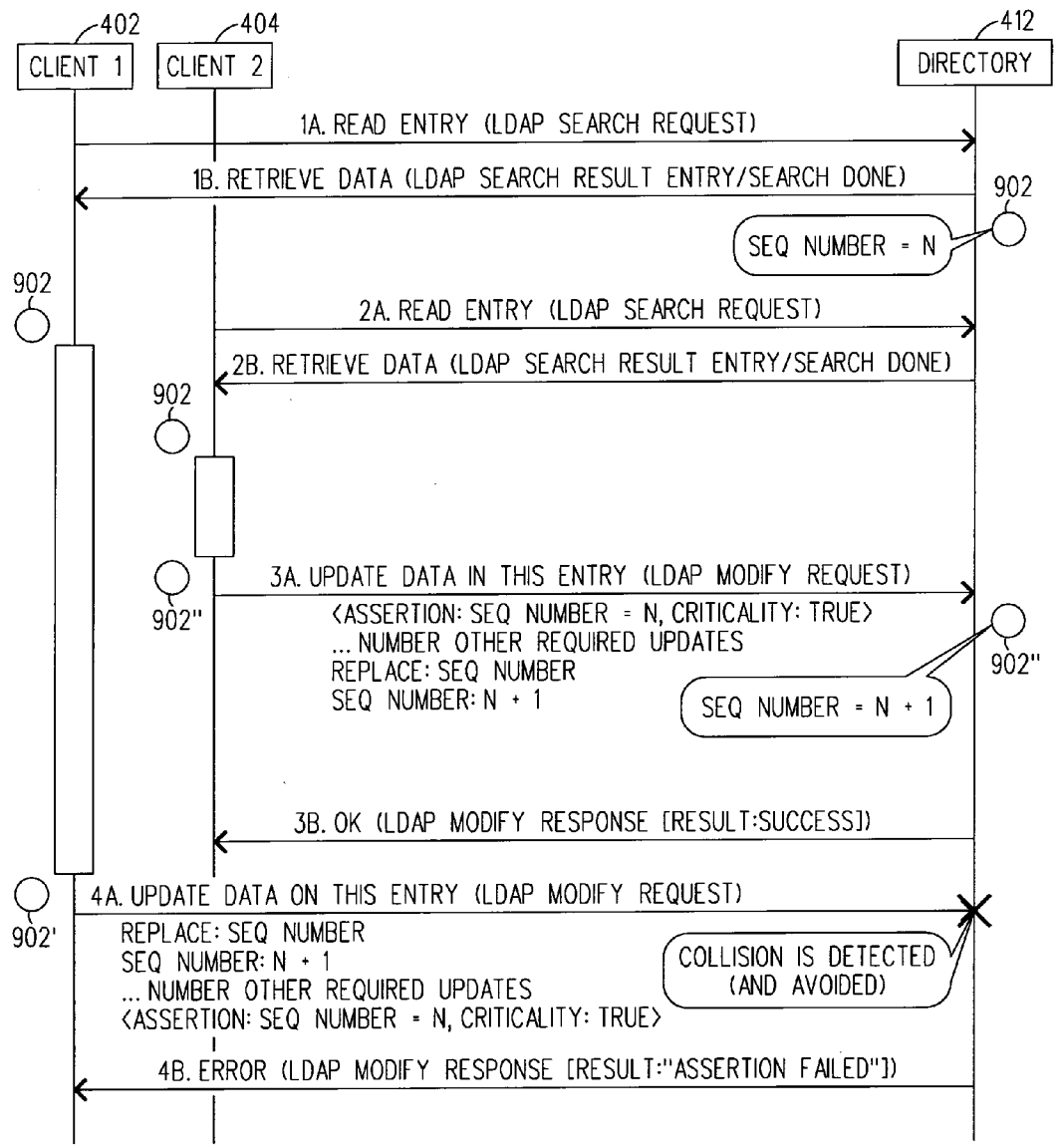
FIG. 9 is a signal sequence diagram used to help explain how the collision problem is solved by a collision detection mechanism/method in accordance with a fourth embodiment of the present invention.

Referring to FIG. 9, there is a signal sequence diagram used to help explain another collision detection mechanism that can be used to detect a collision in accordance with a fourth embodiment of the present invention. This collision detection mechanism makes use of LDAP Assertions which allows clients and in particular LDAPv3 clients to specify a condition that must be true for the operation to be executed by the LDAP directory 412 or otherwise the requested operation will be rejected as a whole. LDAP Assertions have been defined in the aforementioned RFC 4528 and details about LDAPv3 clients can be found in the following document: K. Zeilenga "RFC 4510: Lightweight Directory Access Protocol (LDAP): Technical Specification Road Map", June 2006 (the contents of which are incorporated by reference herein).

In particular, LDAP Assertions are used to check a condition in the same operation as the modification is performed and this results in operation atomicity since both the condition validation and the data modification are performed without any other operation interruption. To enable this, the RFC 4528 defined a new LDAP control (the "assertion control") and the document K. Zeilenga "RFC 4521: Considerations for Lightweight Directory Access Protocol (LDAP) Extensions" June 2006 discusses how this control based mechanism can be extended to LDAPv3 operations (the contents of this document are incorporated by reference herein). For instance, this control may be attached to any LDAPv3 update operation (i.e. Add, Delete, Modify and ModifyDN) to support conditional addition, deletion, modification, and renaming of the target object. The asserted condition is also evaluated as an integral part of the involved LDAPv3 operation. The RFC 4528 also specifies that the target entry in the DIT, i.e. to which the assertion check must be applied (when received), is always one single entry in the DIT, that is the entry or object field in the LDAP request (as a general simplification).

This particular embodiment of the collision detection mechanism uses LDAP Assertions and also defines and adds a new single-valued integer attribute type "Sequence Number" for each entry that requires collision detection. This new single-valued integer attribute type "Sequence Number" may be managed as a cyclical counter. This new single-valued integer attribute may also be declared as a "mandatory" attribute in the desired "structural" object classes (i.e. the object classes used for directory entries) or it may be defined in a new "auxiliary" object class. To implement this collision detection mechanism and solve the modification problem, each LDAP client 402, 404, 408 and 410 would perform the following steps:

1. Read one or several entries, including at least one entry that is a prepared for collision detection (i.e. it includes the SeqNumber attribute type).
2. Apply the business logic using the retrieved data.
3. Request the data to be updated in one entry defined for collision detection. The request would include the following LDAP ModifyRequest operations:

3.1 An "assertion condition" checking that the SeqNumber attribute type still has the value that was read in step 1.
3.2 A "replace" operation to increase the collision detection value stored in the SeqNumber attribute type.
NOTE: The assertion is checked before any requested modification (add/delete/replace) is performed. If the assertion check fails then the whole LDAPModifyRequest operation is discarded.

The signal flow diagram in FIG. 9 illustrates an exemplary scenario using this particular collision detection mechanism of the present invention:

1a. Client 1 sends a message (LDAPSearchRequest) requesting to read data 902 from one or several entries, including at least one entry 1 that is prepared for collision detection. The message also has a request to read the SeqNumber attribute type within the at least one entry 1 of the LDAP directory 412.

1b. Client 1 receives the requested data 902 and the value of the SeqNumber attribute from the LDAP directory 412. This can be done by means of a LDAP Search Result Entry which includes the requested information and the SeqNumber and by means of a LDAP Search Result Done message which indicates the search was a success. At this time, client 1 takes some time to perform any internal logic, for any purpose, like e.g. performing some consistency checks on the read data, connecting to another node to request some more data based on something read . . . . In this case, client 1 has updated data 902'.

2a. Client 2 sends a message (LDAPSearchRequest) requesting to read data 902 from one or several entries, including at least one entry 1 that is prepared for collision detection. The message also has a request to read the SeqNumber attribute type within the at least one entry 1 of the LDAP directory 412. In this example, client 1 and client 2 are interested on modifying data into the same entry (it does not need to be the same attribute, but just the same entry, i.e. any of the attributes for any of the ObjectClasses for that particular entry).

2b. Client 2 receives the requested data 902 and the value of the SeqNumber attribute from the LDAP directory 412. This can be done by means of a LDAP Search Result Entry message which includes the requested information and the SeqNumber and by means of a LDAP Search Result Done message which indicates the search was a success. At this time, client 2 takes some time to perform any internal logic, for any purpose, like e.g. performing some consistency checks on the read data, connecting to another node to request some more data based on something read . . . . In this case, client 2 has updated data 902".

3a. Client 2 sends a message (LDAPModifyRequest) to the LDAP directory 412 requesting an update to data in a collision detection ready entry, where the sequence number originally read was "n". In particular, client 2 sends a LDAP Modify Request which includes: (1) an assertion operation: Assertion: SeqNumber=n, critically: TRUE; (2) modified data 902"; and (3) a replace operation: REPLACE: SeqNumber n+1 (note: step 1 must be true before steps 2 and 3 can be performed). Basically, client 2 sends a LDAP ModifyRequest including the update of the sequence number attribute (increasing its value in 1), and at the same time, the LDAP Modify Request includes as an "assertion" to check the sequence number to assure it is the same that was just read in step 2b. Only if the evaluation of the assertion is TRUE, then is the LDAP Modify operation performed. And, this would happen only if the sequence number has not been increased by any other client, which if it was increased it would reveal that the other client has modified data since it was read in step 2b.

3b. Client 2 receives a LDAP Modify Response from the LDAP directory 412 indicating that the modification request was successful.

4a. Client 1 sends a message (LDAPModifyRequest) to the LDAP directory 412 requesting an update to data in a collision detection ready entry, where the sequence number originally read was "n". In particular, client 1 sends a LDAP Modify Request which includes: (1) an assertion operation: Assertion: SeqNumber=n, critically: TRUE; (2) modified data 902'; and (3) a replace operation: REPLACE: SeqNumber n+1 (note: step 1 must be true before steps 2 and 3 can be performed). In this case, the LDAP directory 412 determines that the assertion is evaluated to FALSE, since the sequence number attribute does not have the same value that this client originally read during step 1b. This means that a collision has been avoided.

4b. Client 1 receives a LDAP Modify Response from the LDAP directory 412 indicating that the modification request was not successful. Thus, client 1 knows that another client modified the data during the time it was processing the read data.

From the foregoing, it should be appreciated that four different collision detection mechanisms have be discussed which allow a first LDAP client to perform an LDAP Search, process the LDAP response, and then send modifications (LDAP Modify) to the LDAP directory 412 while being assured that the requested modification will not be performed if another LDAP client had previously performed a modification on the data that was originally read by the first LDAP client. This is desirable since in this way there are no creations of data inconsistencies. The present invention has several advantages some of which are listed below as follows:

1. Detection of another client's update on some data read before avoids the creation of data inconsistencies. That is, if a client requires some data validation to perform an update, if data is modified, then those updates may cause a problem if that data is finally updated. In other words, a client could be assured that modifications that are dependent on certain values (placed in any part of the DIT) are performed consistently (i.e. relevant data is not modified).

2. Any number of concurrent LDAP clients could be detected.

3. Collisions are detected (and avoided) without needing any lock/unlock mechanism with undesirable "deadlock" side-effects.

4. The collision detection mechanisms based on extending/defining new LDAP messages (as it is the case for the assertion-based one) have a high dependency at the LDAP client side on the final LDAP directory technology that is being used in the system.

5. The collision detection mechanisms of the present invention are also valid for X.500 directory systems as they provide an LDAP Access Gateway which enables communication with the standard LDAP clients.

7. The collision detection mechanisms are not limited to use in the communication field but can be applied to any application in any field which involves the used of LDAP clients and a LDAP directory.

8. The CDC collision detection mechanisms have the following advantages:
   A standard LDAP Client is able to detect whether a collision occurs (i.e. data read by this client may have been updated by other client).

The CDC mechanisms of the present invention rely in part on the standard LDAP that is supported nowadays by any commercial LDAP server implementation. It does not require any extended LDAP support at the LDAP directory or the LDAP clients.

The CDC mechanisms of the present invention implement a mutual exclusive (mutex) mechanism, where the common resource is the data (to be read and modified) and the critical section is the time from the moment the data is read by a LDAP client and the moment the same LDAP client requires data modifications.

9. The LDAP Assertion collision detection mechanism has the following advantages:

A standard LDAP Client is able to detect whether a collision occurs (i.e. data read by this client may have been updated by other client).

The LDAP Assertion mechanism of the present invention relies in part on the standard LDAP. It does not require any extended LDAP support at either the LDAP server or at the LDAP client.

For a more detailed discussion about the basics of LDAP technology, reference is made to the following documents:

1. K. Zeilenga "RFC 4510: Lightweight Directory Access Protocol (LDAP): Technical Specification Road Map", June 2006.

2. J. Sermersheim "RFC 4511: Lightweight Directory Access Protocol (LDAP): The Protocol", June 2006.

3. K. Zeilenga "RFC 4521: Considerations for Lightweight Directory Access Protocol (LDAP) Extensions", June 2006.

4. K. Zeilenga "RFC 4528: Lightweight Directory Access Protocol (LDAP) Assertion Control", June 2006.

5. OpenLDAP Software Mailing List: Message00529 (define/use "lock" attribute types) (downloaded from http://www.openldap.org/lists/openldap-software/200301/msg00529.html).

6. K. Zeilenga "LDAP Transactions", Nov. 18, 2007 (downloaded from http://www.ietf.org/internet-drafts/draft-zeilenga-ldap-tx n-11.txt).

The contents of these documents are hereby incorporated by reference herein.

In summary, the directory 412 which is accessible to a number of clients 402, 404, 406, 408 and 410 for reading and updating data therein is also arranged to detect and avoid an update operation collision on an entry therein by implementing the schemes shown in FIGS. 5 and 8-9 and using the following components (see FIG. 4): input read means 418 receiving a request from a client to read data on an entry in the directory; processing means 420 assigning at least one given collision detection value corresponding to at least one subset of the data on the entry in the directory; output read means 422 submitting towards the client the requested data along with the at least one given collision detection value; input update means 424 receiving a request from the client to modify the at least one subset of the data on the entry in the directory, where the request includes at least one updated collision detection value for each at least one given collision detection value; a collision detector 426 determining whether the at least one updated collision detection value is in accordance with a corresponding current collision detection value or not; output update means 428 either accepting and executing the request to modify the at least one subset of the data on the entry in the directory, where the at least one updated collision detection value is in accordance with the corresponding current collision detection value, or refusing and rejecting the request otherwise; and the processing means 420 setting the current collision detection value to a next value, where the request is found acceptable.

Plus, the client front-end 408 (for example) can access a directory 412 to read and update data therein in accordance with the schemes shown in FIGS. 5 and 8-9 by using the following components (see FIG. 4): output read means 430 for submitting a request to read data on an entry in the directory; input read means 432 for retrieving the requested data along with at least one given collision detection value corresponding to at least one subset of the data on the entry in the directory; processor 434 for processing the retrieved data; output update means 436 for sending a request to modify the at least one subset of the data on the entry in the directory, where the request includes at least one updated collision detection value for each at least one given collision detection value; and input update means 438 for receiving either acceptance of the request to modify the at least one subset of the data on the entry in the directory, where the at least one updated collision detection value is in accordance with a corresponding current collision detection value at the directory, or refusal of the request otherwise.

Although several embodiments of the present invention have been illustrated in the accompanying Drawings and described in the foregoing Detailed Description, it should be understood that the invention is not limited to the disclosed embodiment, but instead is also capable of numerous rearrangements, modifications and substitutions without departing from the spirit of the invention as set forth and defined by the following claims.

The invention claimed is:

1. A method for detecting and avoiding collisions on an entry in a directory upon update operations from more than one client front-end, said method comprising the steps of:

receiving at the directory a request from a client front-end to read data on an entry in the directory;

assigning at the directory at least one given collision detection value corresponding to at least one subset of the data on the entry in the directory, wherein the at least one given collision detection value is a given collision detection counter attribute (CDC), having a value (x) on the entry in the directory;

submitting towards the client front-end the requested data along with the at least one given collision detection value;

receiving at the directory a request from the client front-end to modify the at least one subset of the data on the entry in the directory, the request having at least one updated collision detection value for each at least one given collision detection value, wherein the request having the at least one updated collision detection value includes:

(i) one or more ADD operations as follows ADD: CDC=(x)+1, ADD: CDC=(x)+2... ADD: CDC=(x) +Number of Collisions to Detect (NCD), where NCD has a value equal to or greater than a number of concurrent clients which could possibly read and modify the data from the entry in the directory;

(ii) modified data; and (iii) a REPLACE operation as follows: REPLACE CDC=(x)+1;

determining at the directory whether the at least one updated collision detection value is in accordance with a corresponding current collision detection value or not;

submitting towards the client front-end either acceptance of the request to modify the at least one subset of the data on the entry in the directory, where the at least one updated collision detection value is in accordance with the corresponding current collision detection value, or refusal of the request if the request has an ADD operation that tries to operate on a current CDC attribute having a different value within the entry than the given CDC attribute value (x); and where the request is found acceptable, setting the current collision detection value to a next value.

2. The method of claim 1, wherein the client front-end initiates a transaction with the directory before sending the request to modify the data.

3. The method of claim 1, wherein the request received at the directory from the client front-end to modify the at least one subset of the data includes an assertion condition and wherein the directory makes sure the assertion condition is true before modifying the data in the entry.

4. The method of claim 1, wherein the CDC attribute is a mandatory attribute in a desired structural object class or a new auxiliary object class.

5. The method of claim 1, wherein the CDC attribute is a cyclical counter.

6. The method of claim 1, wherein at least one other given collision detection value is a given sequence number attribute having a value (x) on the entry in the directory; and the request having at least one updated collision detection value includes:
    (i) an assertion condition;
    (ii) modified data; and
    (iii) a REPLACE operation as follows: REPLACE sequence number=(x)+1; and
    wherein the directory determines whether the current sequence number in the entry has the same value as the value of the given sequence number where if yes then the data is modified and the REPLACE operation performed, and if not then the request to modify the data is discarded.

7. A directory accessible to a number of clients for reading and updating data therein, and arranged to detect and avoid an update operation collision on an entry in the directory, the directory comprising:
    input read means receiving a request from a client to read data on an entry in the directory;
    processing means assigning at least one given collision detection value corresponding to at least one subset of the data on the entry in the directory, wherein the at least one given collision detection value is a given collision detection counter attribute (CDC), having a value (x) on the entry in the directory;
    output read means submitting towards the client the requested data along with the at least one given collision detection value;
    input update means receiving a request from the client to modify the at least one subset of the data on the entry in the directory, the request to modify having at least one updated collision detection value for each at least one given collision detection value, wherein the request having the at least one updated collision detection value includes:
    (i) one or more ADD operations as follows ADD: CDC=(x)+1, ADD: CDC=(x)+2...ADD: CDC=(x) +Number of Collisions to Detect (NCD), where NCD has a value equal to or greater than a number of concurrent clients which could possibly read and modify the data from the entry in the directory;
    (ii) modified data; and
    (iii) a REPLACE operation as follows: REPLACE CDC=(x)+1;
    a collision detector determining whether the at least one updated collision detection value is in accordance with a corresponding current collision detection value or not;
    output update means either accepting and executing the request to modify the at least one subset of the data on the entry in the directory, where the at least one updated collision detection value is in accordance with the corresponding current collision detection value, or refusing and rejecting the request if the request has an ADD operation that tries to operate on a current CDC attribute having a different value within the entry than the given CDC attribute value (x); and
    the processing means setting the current collision detection value to a next value, where the request is found acceptable.

8. The directory of claim 7, wherein the input read means is adapted for receiving from the client front-end a request to start a transaction before sending the request to modify the data.

9. The directory of claim 7, wherein the input update means receiving a request from the client to modify the at least one subset of the data is adapted for receiving an assertion condition, and wherein the processing means of the directory is adapted for making sure the assertion condition is true before modifying the data in the entry.

10. The directory of claim 7, wherein the CDC attribute is a mandatory attribute in a desired structural object class or a new auxiliary object class.

11. The directory of claim 7, wherein the CDC attribute is a cyclical counter.

12. The directory of claim 7, wherein the at least one other given collision detection value is a given sequence number attribute having a value (x) on the entry in the directory; and the request having at least one updated collision detection value includes:
    (i) an assertion condition;
    (ii) modified data; and
    (iii) a REPLACE operation as follows: REPLACE sequence number=(x)+1; and
    wherein the collision detector of the directory determines whether the current sequence number in the entry has the same value as the value of the given sequence number where if yes then the processing means is adapted for modifying the data and for performing the REPLACE operation, and if not then the output update means of the directory is adapted for rejecting the request to modify the data.

13. A client front-end accessing a directory to read and update data therein, and comprising:
    output read means for submitting a request to read data on an entry in the directory;
    input read means for receiving the requested data along with at least one given collision detection value corresponding to at least one subset of the data on the entry in the directory, wherein the at least one given collision detection value is a given collision, detection counter attribute (CDC), having a value (x) on the entry in the directory;
    processor for processing the received data;
    output update means for sending a request to modify the at least one subset of the data on the entry in the directory, the request to modify having at least one updated collision detection value for each at least one given collision detection value, the request to modify having the at least one updated collision detection value including:
    (i) one or more ADD operations as follows ADD: CDC=(x)+1, ADD: CDC=(x)+2...ADD: CDC=(x) +Number of Collisions to Detect (NCD), where NCD has a value equal to or greater than a number of concurrent clients which could possibly read and modify the data from the entry in the directory;

(ii) modified data; and (iii) a REPLACE operation as follows: REPLACE CDC=(x)+1; and input update means for receiving either acceptance of the request to modify the at least one subset of the data on the entry in the directory, where the at least one updated collision detection value is in accordance with a corresponding current collision detection value at the directory, or refusal of the request otherwise.

14. The client front-end of claim 13, wherein the output read means is further adapted for submitting towards the directory a request to start a transaction before sending the request to modify the data.

15. The client front-end of claim 13, wherein the output update means is further adapted for submitting an assertion condition with the request towards the directory.

16. The client front-end of claim 13, wherein the CDC attribute is a mandatory attribute in a desired structural object class or a new auxiliary object class.

17. The client front-end of claim 13, wherein the CDC attribute is a cyclical counter.

18. The client front-end of claim 13, wherein at least one other given collision detection value is a given sequence number attribute having a value (x) on the entry in the directory; and the request having at least one updated collision detection value includes:

(i) an assertion condition;

(ii) modified data; and (iii) a REPLACE operation as follows: REPLACE sequence number=(x)+1.

19. A method for detecting and avoiding collisions on an entry in a directory upon an update operation from a client front-end, said method comprising the steps of:

submitting a request from a client front-end to read data on an entry in the directory;

receiving at the client front-end the requested data along with at least one given collision detection value corresponding to at least one subset of the data, the at least one given collision detection value being a given collision detection counter attribute (CDC) having a value (x) on the entry in the directory;

processing the retrieved data at the client front-end;

sending a request from the client front-end to modify the at least one subset of the data on the entry in the directory, the request having at least one updated collision detection value for each at least one given collision detection value, the request having the at least one updated collision detection value, including:

(i) one or more ADD operations as follows ADD: CDC=(x)+1, ADD: CDC=(x)+2 ... ADD: CDC=(x) +Number of Collisions to Detect (NCD), where NCD has a value equal to or greater than a number of concurrent clients which could possibly read and modify the data from the entry in the directory;

(ii) modified data; and (iii) a REPLACE operation as follows: REPLACE CDC=(x)+1;

receiving at the client front-end either acceptance of the request to modify the at least one subset of the data on the entry in the directory, where the at least one updated collision detection value is in accordance with a corresponding current collision detection value at the directory, or refusal of the request otherwise.

20. The method of claim 19, wherein the at least one other given collision detection value is a given sequence number attribute having a value (x) from the entry in the directory; and the request having at least one updated collision detection value includes:

(i) an assertion condition;

(ii) modified data; and (iii) a REPLACE operation as follows: REPLACE sequence number=(x)+1.

* * * * *

UNITED STATES PATENT AND TRADEMARK OFFICE
CERTIFICATE OF CORRECTION

PATENT NO. : 8,204,989 B2  Page 1 of 1
APPLICATION NO. : 12/741407
DATED : June 19, 2012
INVENTOR(S) : Alarcon et al.

It is certified that error appears in the above-identified patent and that said Letters Patent is hereby corrected as shown below:

On the Face Page, in Field (56), under "OTHER PUBLICATIONS", in Column 2, Line 5, delete "Comp," and insert -- Comp. --, therefor.

On the Face Page, in Field (56), under "OTHER PUBLICATIONS", in Column 2, Line 11, delete "Transactions:" and insert -- Transactions; --, therefor.

Figure 1:
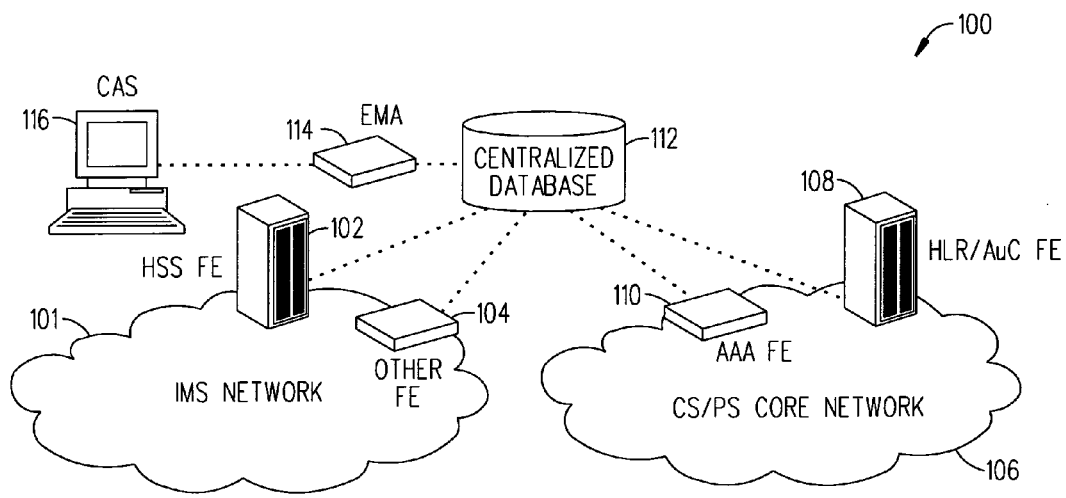
FIG. 1 (PRIOR ART) is a diagram of a communications network having multiple LDAP clients that interface with a LDAP database which is used to help explain a collision problem that is solved by the present invention.
Figure 2:
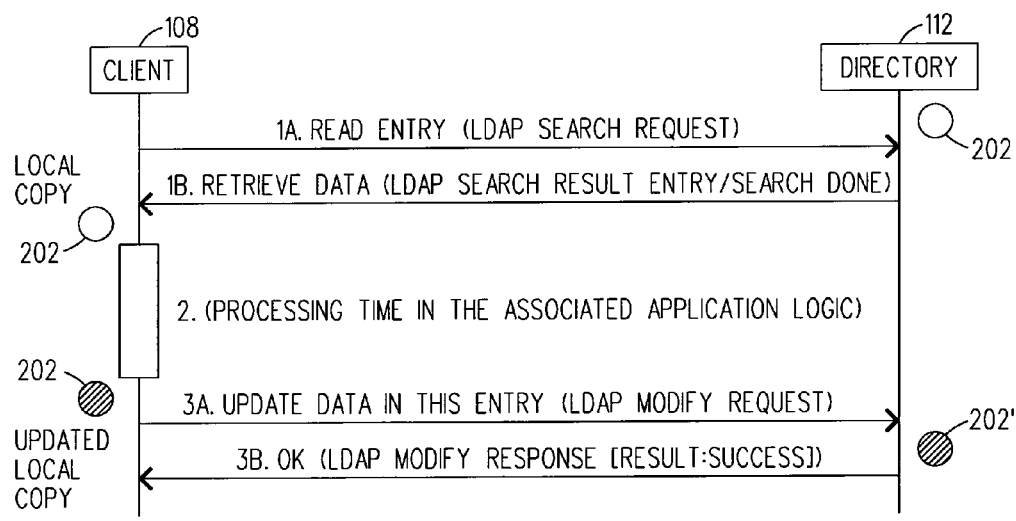
FIG. 2 (PRIOR ART) is a signal flow diagram illustrating how a traditional LDAP client reads data from an entry in a traditional LDAP directory and then modifies the data that is stored within the traditional LDAP directory.
Figure 3:
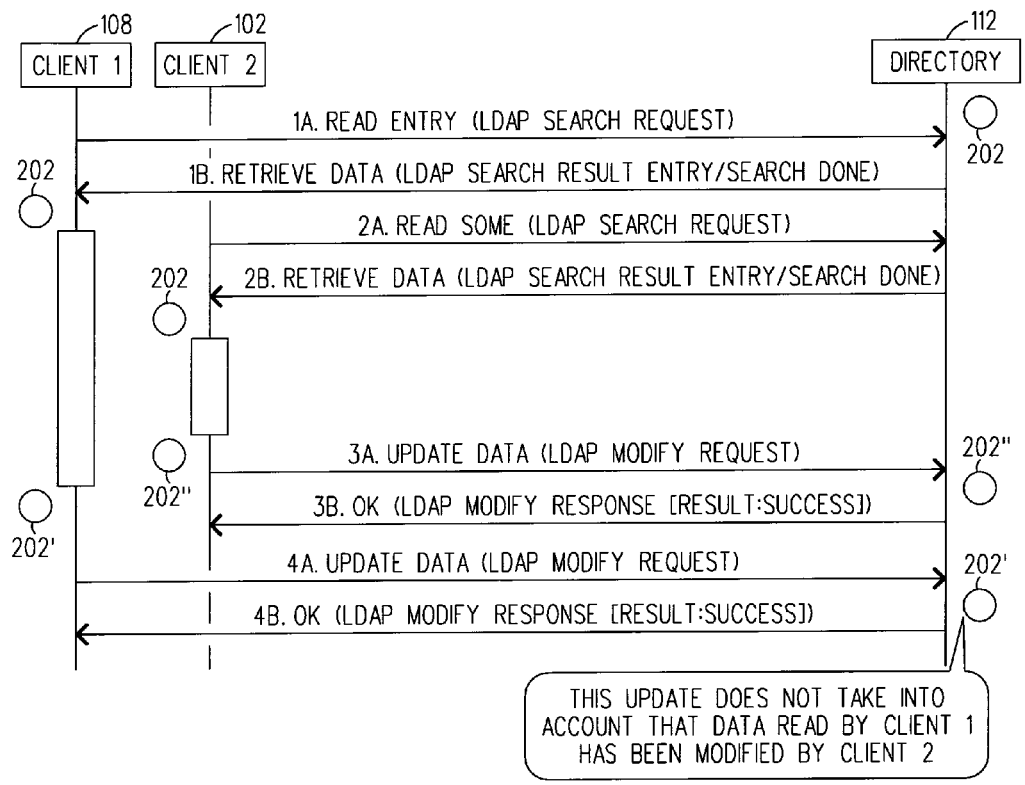
FIG. 3 (PRIOR ART) is a signal flow diagram illustrating how a collision problem occurs when one LDAP client overrides the data that was previously read but not yet modified by another LDAP client.

In Fig. 2, Sheet 1 of 9, delete "  " and insert --  --, therefor.

In Column 1, Lines 8-11, delete "This application claims the benefit of U.S. Provisional Patent Application Ser. No. 60/985/701 which was filed on Nov. 6, 2007 the contents of which are hereby incorporated by reference herein." and insert -- This application claims the benefit of U.S. Provisional Application No. 60/985/701, filed November 6, 2007, the disclosure of which is fully incorporated herein by reference --, therefor.

In Column 6, Line 5, delete "INS" and insert -- IMS --, therefor.

In Column 13, Lines 61-62, delete "client transaction." and insert -- client 1's transaction. --, therefor.

In Column 18, Line 61, delete "used" and insert -- use --, therefor.

In Column 19, Line 38, delete "-tx n-11.txt)." and insert -- -txn-11.txt). --, therefor.

In Column 22, Line 55, in Claim 13, delete "collision, detection" and insert -- collision detection --, therefor.

Signed and Sealed this
Twenty-third Day of October, 2012

David J. Kappos
*Director of the United States Patent and Trademark Office*